(12) United States Patent
Inagaki et al.

(10) Patent No.: US 6,367,986 B1
(45) Date of Patent: Apr. 9, 2002

(54) DISPENSER AND OPTICAL FIBER CONNECTOR

(76) Inventors: Takeo Inagaki, 30-7, Nakatehara 2-chome, Kohoku-ku, Yokohama-si, Kanagawa-ken (JP), 222-0023; Naomi Sakai, 24-7, Kotshasidai 4-chome, Hanamigawa-ku, Chiba-si, Chiba-ken (JP), 262-0005

( * ) Notice: Subject to any disclaimer, the term of this patent is extended or adjusted under 35 U.S.C. 154(b) by 0 days.

(21) Appl. No.: 09/367,482
(22) PCT Filed: Dec. 7, 1998
(86) PCT No.: PCT/JP98/05516
    § 371 Date: Oct. 19, 1999
    § 102(e) Date: Oct. 19, 1999
(87) PCT Pub. No.: WO99/30984
    PCT Pub. Date: Jun. 24, 1999

(30) Foreign Application Priority Data

Dec. 12, 1997 (JP) ............................................. 9-369768
Apr. 28, 1998 (JP) ........................................... 10-155113

(51) Int. Cl.[7] ................................................ G02B 6/38
(52) U.S. Cl. ............................ 385/73; 385/76; 385/77; 385/78; 385/80; 385/139; 385/141; 385/134
(58) Field of Search ............................. 385/70, 73, 72, 385/55, 60, 76, 77, 78, 80, 139, 141, 134

(56) References Cited

U.S. PATENT DOCUMENTS

| | | | | |
|---|---|---|---|---|
| 4,448,483 A | * | 5/1984 | Ryley, Jr. ................... | 385/73 X |
| 5,231,684 A | * | 7/1993 | Narciso Jr. et al. ........... | 385/80 |
| 5,778,125 A | * | 7/1998 | Busse et al. .................... | 385/80 |
| 5,858,161 A | * | 1/1999 | Nakajima et al. ........... | 156/293 |
| 5,913,001 A | * | 6/1999 | Nakajima et al. ............. | 385/80 |
| 6,086,704 A | * | 7/2000 | Kanai et al. ................. | 156/267 |
| 6,196,730 B1 | * | 3/2001 | Hammar ....................... | 385/76 |

FOREIGN PATENT DOCUMENTS

| | | | |
|---|---|---|---|
| JP | 48-080937 | 10/1973 | ............. 385/141 X |
| JP | 58-500470 | 3/1983 | ............. 385/141 X |
| JP | 62-137065 | 6/1987 | ............. 385/141 X |
| JP | 62-149005 | 9/1987 | ............. 385/141 X |
| JP | 3-240678 | 10/1991 | ............. 385/141 X |
| JP | 4-81704 | 3/1992 | ............. 385/141 X |

\* cited by examiner

*Primary Examiner*—Brian Healy
(74) *Attorney, Agent, or Firm*—John Russell Uren

(57) ABSTRACT

A dispenser (30) for discharging gel (22) used to bond end surfaces of cores of optical fiber, comprising an outer tube (32) provided with a through hole (34) in one end portion thereof and opened at the other end portion thereof, a syringe (10) having at one end portion thereof a nozzle, which is inserted through the through hole (34), and a gel sealing piston head, and a discharge means fixed to the outer tube (32), contacting the piston head (18) and adapted to press the piston head and discharge the gel (22); and an optical fiber connector comprising an adapter (68) having a central through hole extending along the axis thereof, into which fitting members (74, 76) to which optical fibers (62A, 62B) with conductors (64A, 64B) projecting from both sides thereof in a predetermined length are fitted firmly are fitted, a sleeve (70) fitted firmly in the through hole, and a gel-carrying light relaying transmission member (68) sealed in the sleeve.

18 Claims, 3 Drawing Sheets

DISPENSER AND OPTICAL FIBER CONNECTOR

FIELD OF TECHNOLOGY

The present invention relates to a dispenser for dispensing a low cross-linking-density gel used to connect optical fibers, and an optical fiber connector for connecting end faces of optical fibers.

TECHNICAL BACKGROUND

An optical fiber connector, a fixed connecting device, a light combining/splitting device or like device has been generally used to connect end faces of optical fibers.

A mechanical contact method is mainly used to connect end faces of optical fibers in an optical fiber connector. According to this mechanical contact method, ferrules are respectively fitted on cores of both optical fibers and are inserted into fitting holes, which are formed in the opposite side surfaces of a connector main body to communicate with each other in linear alignment with each other, from the opposite sides of the connector main body, and the end faces of the two cores having the ferrules fitted therearound are fixed in abutment against each other to be connected with each other.

Besides the above mechanical contact method, for example, there have been proposed the use of a lens as an optical conductor at a joint portion and the use of a matching oil in the optical fiber connector as disclosed in Japanese Unexamined Patent Publications No. 56-110912 and No. 56-81807, respectively.

On the other hand, matching oil, matching grease, epoxy resin or the like is used as an optical conductor for the connection of optical fibers in a fixed connecting device or light combining/splitting device.

It is basically required in the connection of the optical fibers to maximally eliminate the diffusion of light at the joint portion of the two end faces.

However, according to the method for mechanically bringing the end faces of the optical fibers into contact with each other, an air layer is inevitably present between the end faces due to its mechanical construction. Since this air layer and the cores of the optical fibers have different refractive indices, light is diffused due to a difference in refractive index, resulting in a loss of light.

An arrangement of an optical conductor between the end faces has been proposed and put into practice in order to eliminate the air layer and prevent the loss of light.

However, the prior art method using a lens as the optical conductor necessitates a complicated construction and the use of a large-sized apparatus and has a problem in reliability during the attachment and detachment of the optical fibers. Thus, this method has low industrial applicability.

The prior art method using matching oil as the optical conductor has problems of flow-out and oxidation of the oil resulting from increase and decrease of temperature, and a problem of a short life. Particularly, if silicone oil is used as the matching oil, it is difficult to prevent the silicone oil from flowing out due to its creeping characteristic. Thus, the use of the matching oil compels an exchange of oil after a certain period of time and, therefore, has low industrial applicability.

On the other hand, the method using grease as the optical conductor has been proposed in order to avoid the above problems of flow-out and oxidation of oil. Grease can certainly avoid an undesirable event of flow-out due to its high viscosity, but cannot avoid problems of changes in characteristics caused by temperature and a difference in refractive index between a thickening agent and a composition and has a lower light transmittance as compared to the case where the matching oil is used. Further, grease has a fatal problem of being unable to restore (eliminate) air bubbles produced by a displacement of the two end faces at the joint portion. Therefore, grease also has low industrial applicability.

According to the prior art method using an epoxy resin as the optical conductor, the epoxy resin is cured by heating or air-cured, and displays a satisfactory performance over a long period of time. However, this method has an unavoidable problem of coloring due to oxidation. In view of operability, mixing of a curing agent, removal of air bubbles, curing by heating, etc. are necessary during the manufacturing process. Further, in the case of defective connection of the end faces, the optical fibers have to be thrown away and the whole process has to be resumed from the beginning. This method is used despite its poor yield, but has low industrial applicability.

On the other hand, the inventors of the present application invented the filling of a gelatinous material having a refractive index similar to that of the cores of the optical fibers. However, there is no dispenser for dispensing a very tiny predetermined amount of this gelatinous material. Thus, despite the finding of the inventive gelatinous material, it cannot be dispensed by a predetermined amount into an optical conductor. Therefore, there is a demand for an improved dispenser.

The present invention was developed in view of the above situation, and a main object thereof is to provide a dispenser which can dispense a low cross-linking-density gel used to join end faces of optical fibers.

It is another object of the present invention to provide an optical fiber connector which can join end faces of optical fibers while effectively suppressing the diffusion of light despite its simple construction.

It is still another object of the present invention to provide an optical fiber connector which can suppress the diffusion of light by maintaining its working performance over a long period of time.

DISCLOSURE OF THE INVENTION

In order to solve the aforementioned problems and accomplish the above objects, a dispenser, comprising;

an outer tube having one end formed with an insertion hole and the other end being open, and extending straight along a specified longitudinal axis, a syringe having one end to which a nozzle insertable into the insertion hole is attached, and being adapted to contain a low cross-linking-density gel which has been produced therein, a piston head slidably provided in the syringe along a longitudinal direction for sealing the low cross-linking-density gel therein, and a dispensing means mounted on the outer tube for coming into contact with the piston head through the open other end of the syringe to push it, thereby dispensing the low crosslinking-density gel in the syringe through the nozzle.

In the inventive dispenser, a cap for sealing the inside of the syringe is mounted on the syringe instead of the nozzle when the low cross-linking-density gel is produced in the syringe.

In the inventive dispenser, the piston head seals the inside of the syringe as a sealing packing when the low cross-linking-density gel is produced in the syringe.

In the inventive dispenser, the dispensing means is so constructed as to dispense a predetermined amount of the low cross-linking-density gel.

In the inventive dispenser, the dispensing means includes:

a piston rod which is movably mounted on the outer tube along the longitudinal direction and whose leading end can be brought into contact with the piston head, a first engaging means provided between the piston rod and the outer tube for moving the piston rod along the longitudinal direction as the piston rod is rotated, a rotary tube rotatably mounted on the outer surface for covering the piston rod, a second engaging means which is provided between the rotary tube and the piston rod and is engaged to rotate the piston rod together as the rotary tube is rotated and permit the movement of the piston rod along the longitudinal direction, and a rotation locking means for locking the rotary tube such that the rotary tube is rotatable by a specified angle every time it is turned.

In the inventive dispenser, the rotary tube is transparent so that the inside thereof is visible from outside.

In the inventive dispenser, the outer circumferential surface of the rotary tube is so graduated as to indicate a remaining amount of the low cross-linking-density gal in the syringe, In the inventive dispenser, the outer tube is integrally mounted with a mount block having a center hole which penetrates the mount block along its center axis, the piston rod is slidably inserted into the center hole; and the first engaging means includes a lead groove formed on the outer surface of the piston rod and a lead groove formed in the inner surface of the center hole; the two lead grooves being meshed with each other; and the piston rod is moved along the longitudinal direction as being rotated about the center axis by the spiral engagement.

In the inventive dispenser, the second engaging means includes at least one elongated projection formed on the piston rod and extending along the longitudinal direction and at least one spline groove formed in the inner surface of the rotary tube and extending along the longitudinal direction, the at least one projection and the at least one spline groove being engaged with each other.

In the inventive dispenser, the rotary tube is so mounted as to cover the outer circumferential surface of the mount block, and the rotation locking means includes a plurality of recesses formed in the outer circumferential surface of the mount block and circumferentially arranged at equal intervals, and a locking ring mounted on the rotary tube and selectively elastically engageable with one of the plurality of recesses.

The invention is also directed to an optical fiber connector, comprising:

an adapter formed with a center through hole extending along its center longitudinal axis, fittings bearing optical fibers from which cores project by specified distances being mountable into the through hole from the opposite sides such that the cores are aligned with each other, and an optical conductor arranged in the center through hole and including a sleeve fitted into the through hole and a low cross-linking-density gel filled in the sleeve, wherein the cores are inserted into the low cross-linking-density gel from the opposite sides such that the end faces thereof are opposed to each other.

In the inventive optical fiber connector, fixing nuts for fixing the fittings mounted into the adapter to the adapter are further provided.

In the inventive optical fiber connector, the sleeve is made of a synthetic resin which is stable against the low cross-linking-density gel filled therein.

In the inventive optical fiber connector, the low cross-linking-density gel is produced by causing a flexible silicone gel material adjusted to have a specified refractive index to undergo an addition reaction in a binding region where cross-linking density is low.

In the inventive optical fiber connector, the specified refractive index is substantially equal to that of the cores of the optical fibers to be connected.

In the optical fiber connector, the flexible silicone gel material is a polyorganosiloxane having vinyl groups at its ends and a polyorganosiloxane having covalently bound hydrogen atoms.

In the inventive optical fiber connector, the addition reaction is performed by heating.

In the inventive optical fiber connector, the low cross-linking-density gel is produced in a clean room.

SUMMARY OF THE INVENTION

A first requirement for a material used for the connection of end faces of optical fibers is that it is easily deformable like an elastic material during the connection, can be formed to have an extremely small thickness, is not allowed to flow like usual viscous matter or liquid, and does not contain in its texture anything, which hinders the propagation of light, such as filler, dust or air bubbles having different refractive indices.

A second requirement for this material is that it is resistant to changes in outer environments such as temperature, humidity, pressure and vibrations.

A third requirement for this material is that it does not permit dust, vapor, water and the like to intrude thereinto.

A fourth requirement for this material is that it enables an easy connecting operation which can be completed within a short period of time. Specifically, it is required not to increase a temperature for vacuum deaeration and curing in the connecting operation using an epoxy resin.

The inventors of the present application studied the structures of various elastic materials and viscous materials during the development of a material which satisfies the above requirements and, in their study, directed their attentions to a macromolecule having a three-dimensional reticulated structure insoluble in a solvent and a gel structure which is a swollen material of such a macromolecule. Consequently, they established a compounding technique according to which a transparent flexible silicone gel material selected as a base material among synthetic gels was gelatinized at a low cross-linking density, thereby forming a low cross-linking-density gel (gel-fluid intermediate) which has a shape retaining property, which is a characteristic of a gelatinous elastic material, while having fluidity.

As a result of repeated devotion and efforts, the inventors completed a compounding technique for producing a low cross-linking-density gel which satisfies all of the aforementioned requirements and found out that this material was optimal as a material used for the connection of end faces of optical fibers. In other words, by merely providing the thus produced low cross-linking-density gel between the end faces of the optical fibers, a loss of light at the joint portion when light was transmitted from one optical fiber to the other could be effectively suppressed and conducting efficiency was remarkably improved.

In this invention, the low cross-linking-density gel is produced as follows.

A transparent flexible silicone gel material having a specified refractive index as a primary agent is caused to undergo an addition reaction in a binding region where cross-linking density is low, with the result that the low cross-linking-density gel having a viscosity and a minimum fluidity can be obtained. As a result of the addition reaction in the binding region where cross-linking density is low, free hydrogen atoms are advantageously absent since a total amount of active hydrogen atoms contribute to the reaction.

In the above addition reaction, a polyorganosiloxane having vinyl groups at its ends, which is a component of the primary agent, and a polyorganosiloxane having covalently bound hydrogen atoms are cross-linked in the presence of a platinum catalyst.

A range of the cross-linking density was specified by an amount of the polyorganosiloxane having covalently bound hydrogen atoms, and a final cross-linking density could be substantially precisely controlled. The cross-linked binding region of the low cross-linking-density gel is in the range of 30% to 10% of the theoretical equivalent of the polyorganosiloxane containing covalently bound hydrogen atoms.

If the gel is produced beyond the above cross-linked binding region, it displays properties more similar to those of an elastic material as the ratio of the polyorganosiloxane having covalently bound hydrogen atoms increases. As a result, the gel loses its fluidity and comes to possess a breakage point, which is not preferable. On the other hand, if the gel is produced below the above cross-linked binding region, the primary agent which is not cross-linked has an increased degree of freedom. As a result, the gel becomes considerably fluid and creeping flow peculiar to silicone takes place, which are both not preferable.

The refractive index of the low cross-linking-density gel can be adjusted to a value substantially equal to those of various optical fibers by adjusting the refractive index of a transparent silicone oligomer as a primary agent in advance. Thus, a loss of light caused by the reflection and diffusion of light due to a difference in refractive index between the cores of the optical fibers to be connected and the low cross-linking-density gel can be suppressed to a minimum level.

As described above, the presence of an air layer at the joint portion when the cores of the optical fibers are connected is not preferable because it brings about a loss of light. Further, a distance between the end faces of the cores is preferably as short as possible. Since the inventive gel can easily flow and be deformed upon being forcibly contacted to thereby securely eliminate an air layer between the end faces of the cores and flatten tiny scratches and polishing streaks, it can suppress a loss of light caused by the presence of the air layer to a minimum level.

The physical properties of such a low cross-linking-density gel and the influences of changes in outer environments thereon can be summarized as follows.

(1) Temperature: wide working temperature range of −40° C. to 120° C.,
(2) Humidity: moisture absorption into the component is 0%,
(3) Water: water absorption into the component is 0.1% or less,
(4) Dust: dust adheres to the outer surface, but does not permeate into the component,
(5) Pressure: pressurized portion is free to deform,
(6) Vibration: vibration does not cause dilatancy,
(7) Oxidation: unoxidizable and stable against most chemicals,
(8) Flow-out: does not flow out,
(9) Performance: substantially semipermanently maintained.

As can be seen from the above, the low cross-linking-density gel cannot be influenced by any outer environment except a temperature exceeding its own pyrolysis temperature and is most suitably used as an optical conductor and thus is sufficiently useful.

Since the low cross-linking-density gel is used in an extremely narrow area between cores of optical fibers having a diameter of 10 to 50 $\mu$m, fine dust or like fine particles should not adhere to the surface thereof. Further, the manufacturing process should not be performed in an environment which permits an access of foreign matters such as dust. Thus, in order to use the low cross-linking-density gel as the optical conductor, a vessel used to produce this gel is desired to be a vessel (syringe) chosen in consideration of the manufacturing process as well as how the gel is actually used. In other words, it is essential that the compounded material filled in the vessel be kept sealed until the gel is actually used after the reaction step.

Conditions required for the above vessel (syringe) are that it has a tubular body which has at least inner circumferential surface thereof formed straight and is open at the opposite ends, one of the open ends has a common mount portion on which a sealing cap used during the manufacturing process and a nozzle used during the application of the gel are selectively mountable since the open end serves as a material injecting opening or a dispensing opening for the low cross-linking-density gel, and a sealing packing, which serves as a receiving portion when raw materials of the low cross-linking-density gel are filled, is movably accommodated in the vessel along its longitudinal direction.

It should be noted that the vessel and the sealing packing can be made of any material provided that this material does not hinder the addition reaction of the silicone.

In order to fill the low cross-linking-density gel described above between the end faces of optical fibers, a dispenser for dispensing a predetermined amount of this gel is necessary. It is essential for the dispenser to have a vessel (syringe) for containing the low cross-linking-density gel to be dispensed, it is not preferable to transfer the low cross-linking-density gel separately formed to this vessel (syringe) in view of the generation of air bubbles. Accordingly, the inventors newly developed a vessel (syringe) having a function as a reaction vessel during the production of the low cross-linking-density gel and a function as a containing vessel for containing the produced low cross-linking-density gel to be dispensed, and assembled this vessel into a dispenser. As a result, a predetermined amount of the low cross-linking-density gel could be applied while satisfying the aforementioned conditions.

Further the optical fibers could be easily connected and the diffusion of light during the connection could be suppressed to a minimum level by filling the aforementioned low cross-linking-density gel into an optical fiber connector.

BEST MODE FOR CARRYING OUT THE INVENTION

Hereinafter, the construction of one embodiment of an inventive dispenser for dispensing a low cross-linking-density gel and that of an inventive optical fiber connector filled with the low cross-linking-density gel are described. Prior to this description, the low cross-linking-density gel and a production method therefor are described in detail with reference to the accompanying drawings.

{Description of a Producing Method}

First, an exemplary method for producing the low cross-linking-density gel is described.

The low cross-linking-density gel used as an optical conductor for connecting optical fibers is produced as follows. First, the refractive index of a transparent flexible silicone gel material, specifically a transparent silicone oligomer as a base material is so adjusted as to lie within a range of 1.43 to 1.50. A composition is produced by cross-linking the thus adjusted transparent silicone oligomer and a polyorganosiloxane containing covalently bound hydrogen atoms to be added as a cross-linking agent to the primary agent in the presence of a platinum catalyst in a binding region where cross-linking-density is low and an addition rate of the cross-linking agent is 30% in theoretical equivalent.

Figure 1:
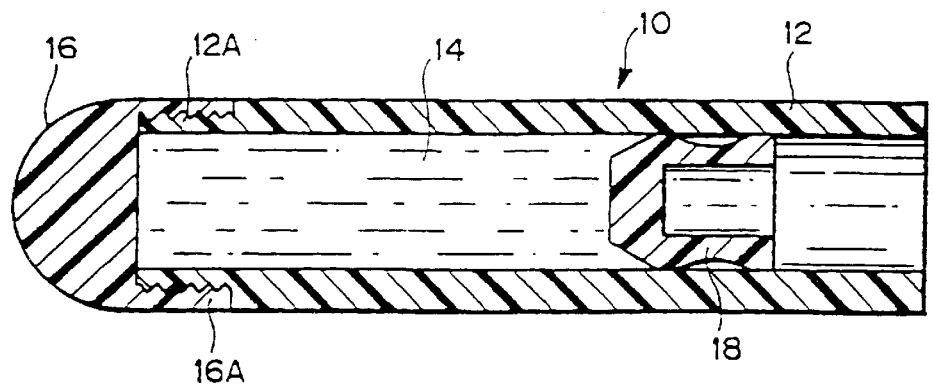
FIG. 1 is a vertical section showing the construction of a syringe functioning as a reaction vessel when a low cross-linking-density gel is produced.

The thus produced composition is filled into a syringe 10 shown in FIG. 1, and is caused to undergo an addition reaction in a constant temperature bath at a temperature of to 100° C. maximum for a reaction time of from 1 hour to 6 hours. As a result, a low cross-linking-density gel which is viscous and has a minimum fluidity despite being a three-dimensionally cross-linked material of low density is obtained in the syringe 10.

It is preferred that such a production method is carried out in a clean room and that the storage of raw materials, compounding, filling into the syringe 10 and reaction process are all carried out in the clean room.

{Description of the Low Cross-linking-density Gel}

The low cross-linking-density gel produced as above has the following physical properties:

(i) Composition: silicone mixture, (ii) Refractive Index, 1.46 (adjustable within a range of 1.43 to 1.50), (iii) Working Temperature Range: stable within a temperature range of −40° C. to 120° C., (iv) Moisture/Water Absorption: at most 0.1% within a temperature range of 25° C. to 100° C.

(v) Dust: adhere to the outer surface, but does not permeate into the texture, (vi) Resistance to Pressure/Vibration: deformable upon being pressurized, but does not undergo thixotropy, (vii) Viscosity: at least 100,000 cP, (viii) Oxidizability: will not be oxidized, (ix) Chemical Resistance: insoluble in most solvents, (x) Fluidity: has no fluidity, but is freely deformable upon an external force, (xi) Performance Retaining Period: at least 20 years when being kept at normal temperature.

The low cross-linking-density gel having the above physical properties displays the following effects when being used as an optical conductor.

First, concerning the light transmitting property, the loss of light was reduced and transmittance was improved by using this low cross-linking-density gel as the optically connecting conductor at the joint portion of the optical fibers. In this example, the loss of light could be reduced to about $\frac{1}{10}$ as compared to a case where the mechanical contact method is used, and transmittance was improved by about 30%.

More specifically, results of a comparative experiment for verifying the light transmitting property of the low cross-linking-density gel are as follows.

| Polished state of end faces of optical fibers | Transmittance when the end faces were merely brought into contact | Transmittance when the low cross-linking-density gel was used |
|---|---|---|
| Cut by a cutter | 68.50% | 90.50% |
| Polished by an abrasive cloth having a grain in diameter of 0.03 mm | 73.28% | 94.79% |
| Polished by an abrasive cloth having a grain diameter of 0.012 mm | 77.14% | 97.28% |
| Polished by an abrasive cloth having a grain diameter of 0.003 mm | 77.85% | 99.35% |

Concerning the properties, the low cross-linking-density gel is an aggregate which is an intimidate of an elastic material and liquid; is viscous despite its cross-linking structure of very low density; is freely deformable upon being pressurized; adheres to a pressurized material, and is restored to its original shape upon being released from pressure. This gel will not be softened or fluidized upon application of heat. Since this gel has no free hydrogen atoms as a binding site, it will not be chemically bound with the cores of the optical fibers and components of a cladding and is very unlikely to hinder the propagation of light.

As a result, the low cross-linking-density gel filled as the optical conductor at the joint portion of the optical fibers flattens the unevenness of the end faces of the optical fibers using coupling pressure, thereby reducing the reflection and diffusion of light to a considerably low level, and is stable over a long period of time without flowing out.

In an example of experiment confirming such effects, a small amount of the low cross-linking-density gel was held between a pair of glass plates, which was then vertically held in a constant temperature bath at 120° C. for 1000 hours, Thereafter, displacement of the glass plates was measured, but the gel was confirmed to have neither been displaced nor become fluid.

Subsequently, only about 5 mg of the low cross-linking-density gel was filled into an FC optical fiber connector, and optical fibers are repeatedly attached and detached 50 times and transmittance was measured each time. The original transmittance was maintained up to the $20^{th}$ measurement, and started slightly varying thereafter. However, this variation was not to such an extent that practicability would be hindered.

The construction of a dispenser for filling the low cross-linking-density gel into the FC optical fiber connector and the state of the low cross-linking-density gel filled in the dispenser are described in detail later with reference to the pertinent drawings.

Further, an outer socket of the above FC optical fiber connector was detached, and the optical fibers were dropped into water while being connected by an assembly comprised only of ferrules and a sleeve. Transmittance was measured with the low cross-linking-density gel exposed to water. The obtained measurement values were stable without varying independently of the elapse of time.

When boiling water was poured to a portion of the FC optical fiber connector where the low cross-linking-density gel was exposed, a 10% reduction in transmittance was observed. However, as the temperature returned to room temperature, transmittance gradually returned to the original value. When boiling water was poured onto the optical fibers, transmittance changed as above.

Thus, the optical conductor or the low cross-linking-density gel filled into the joint portion of the optical fibers is sufficiently resistant to temperature, humidity, pressure, vibration, dust, water and vapor and can contribute to simplifying the construction of the conventionally used devices such as optical connectors, fixed connecting devices and light combining/splitting devices, and is therefore highly industrially applicable.

{Description of the Syringe 10}

The aforementioned syringe 10 has following two applications.

(A) The first application is to be used as a reaction vessel in which composition is filled and caused to react as shown in FIG. 1.

Figure 2:
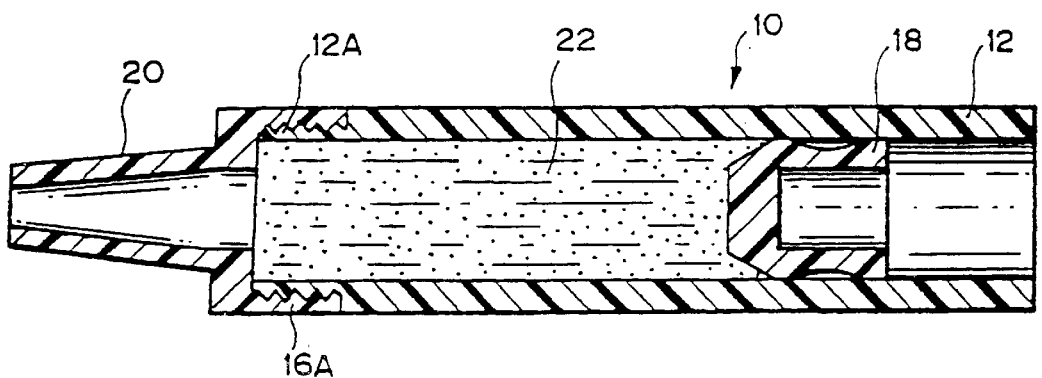
FIG. 2 is a vertical section showing the construction of the syringe functioning as a containing vessel when the produced low cross-linking-density gel is contained.

(B) The second application is to be used as a containing vessel in which a nozzle 20 is mounted on the dispensing end of the syringe 10 as shown in FIG. 2 and which is assembled into the dispenser for supplying (applying) a predetermined amount of the produced low cross-linking-density gel to the joint portion.

The construction of one embodiment of the syringe 10 used for the above two applications is described in detail with reference to FIGS. 1 to 3.

First, the construction used for the first application is described with reference to FIG. 1. The syringe 10 has a tubular syringe main body 12, which is so formed as to have a straight inner surface and openings at the opposite ends. In this embodiment, the syringe main body 12 has even thickness and, thus, has a straight outer surface. Particularly, the right end of the syringe 10 in FIG. 1 is fully open.

The left opening of the syringe main body 12 in FIG. 1 is specified to be commonly used as an admitting opening through which the aforementioned composition 14 is admitted and a dispensing opening through which the low cross-linking-density gel is dispensed. An external thread 14A is formed on the outer circumferential surface of the end where this admitting/dispensing opening is formed, and a cap 16 is detachably mounted on the admitting/dispensing opening. Accordingly, an internal thread 16A is formed in the inner surface of the cap 16. A portion between the syringe main body 12 and the cap 16 is so held as to prevent the entrance and escape of liquid with the external thread 12A and the internal thread 16A engaged with each other.

On the other hand, a sealing packing 18 which serves as a receiving portion when the aforementioned composition 14 is fitted into the syringe main body 12 is movably accommodated in the syringe main body 12 along its longitudinal axis.

Figure 3:
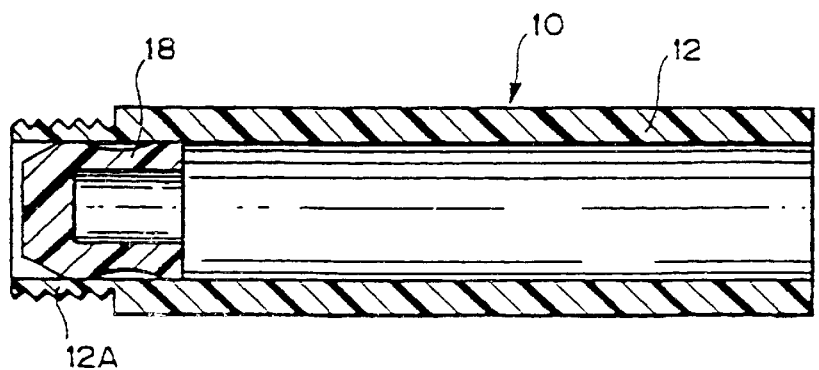
FIG. 3 is a vertical section showing an intermediate state when a composition is filled into the syringe.

In the syringe 10 thus constructed, the cap 16 is detached as shown in FIG. 3 and the sealing packing 18 is accommodated while being shifted toward the left in FIG. 3 when the composition 14 is admitted. In this state, the composition 14 is gradually admitted into the syringe main body 12 through the admitting/dispensing opening. As the composition 14 is admitted, the sealing packing 18 is gradually moved toward the right by being pushed by the composition 14. After the admittance of a specified amount of the composition 14, the cap 16 is mounted, thereby completing the syringe 10 having the composition 14 filled therein as shown in FIG. 1.

The syringe 10 having the composition 14 filled therein is placed in an unillustrated constant temperature bath as it is and is heated under specified heating conditions. The composition 14 in the syringe 10 is caused to undergo an addition reaction by this heating, and becomes a low cross-linking-density gel 22.

On the other hand, when the thus produced low cross-linking density gel 22 is to be filled into the joint portion of the optical fibers, the cap 16 is detached and the nozzle 20 is mounted instead in the clean room, with the result that the syringe 10 has a construction shown in FIG. 2.

Alternatively, it may be considered to suck up the low cross-linking-density gel 22, which was obtained by an addition reaction in a separate reaction vessel, by a device like a hypodermic syringe and to inject it into the syringe 10. However, if the low cross-linking-density gel 22 produced outside the syringe 10 is injected into the syringe 10, air bubbles may enter the low cross-linking-density gel 22 during the injection, and it is extremely difficult to inject the low cross-linking-density gel 22 into the syringe 10 while preventing the entrance of such air bubbles.

If air bubbles should enter the low cross-linking-density gel 22 during the injection of the low cross-linking-density gel 22, no measures can be taken to remove the air bubbles and the low cross-linking-density gel 22 has to be thrown away as a defective gel. On the other hand, the composition 14 is liquid and, if air bubbles enter it, they naturally come up if the syringe 10 is left standing. Thus, air bubbles can be removed from the composition 14 without any problem.

From this point of view, it is fairly meaningful that the syringe 10 has both a function as the reaction vessel and a function as the containing vessel. In other words, particular effects can be obtained by producing the low cross-linking-density gel 22 by the addition reaction of the composition 14 in the syringe 10 as a containing vessel to be assembled into the dispenser 30 to be described later.

{Description of the Dispenser 30}

Next, the construction of one embodiment of the inventive dispenser 30 for dispensing a predetermined amount of the low cross-linking-density gel 22 contained in the syringe 10 is described in detail with reference to FIGS. 4 and 5.

The dispenser 30 is provided with an outer tube 32 in the form of a hollow cylinder in which the syringe 10 described above is accommodated as shown in FIG. 4. The outer tube 32 has a closed left end and a fully open right end in FIGS. 4 and 5. In the middle of the left end of the outer tube 32 is formed an insertion hole 34 which extends in the thickness direction of the left end and into which the nozzle 20 mounted on the aforementioned syringe 10 is inserted. At the left side of the inner surface of the outer tube 32 is formed a step 36 with which the left end surface of the syringe 10 accommodated into the outer tube 32 comes into contact to be located in a specified position in the outer tube 32.

Figure 4:
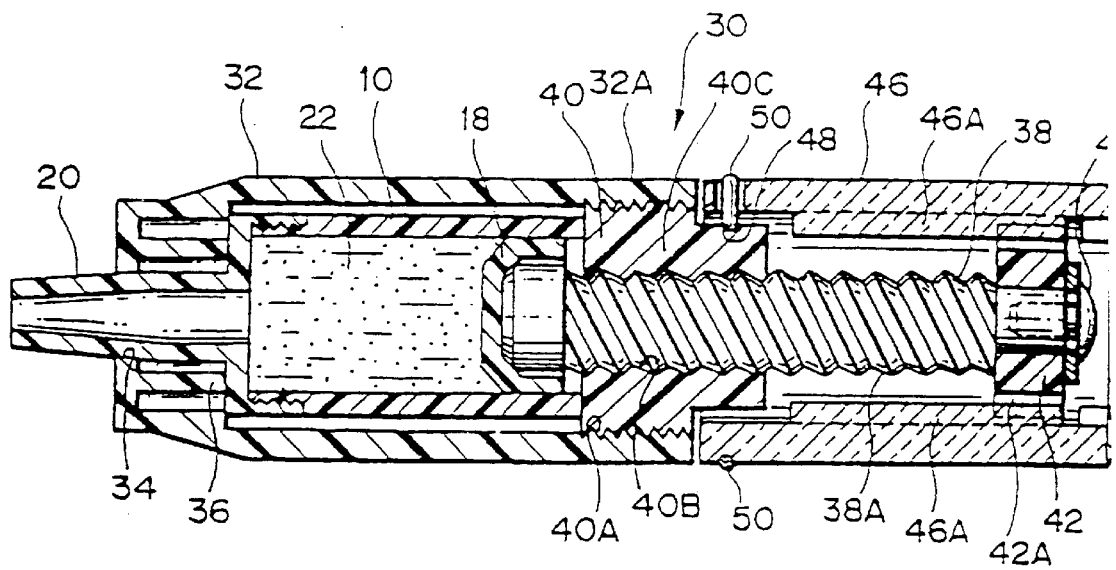
FIG. 4 is a vertical section showing the construction of one embodiment of an inventive dispenser for dispensing a predetermined amount of the low cross-linking-density gel.
Figure 5:
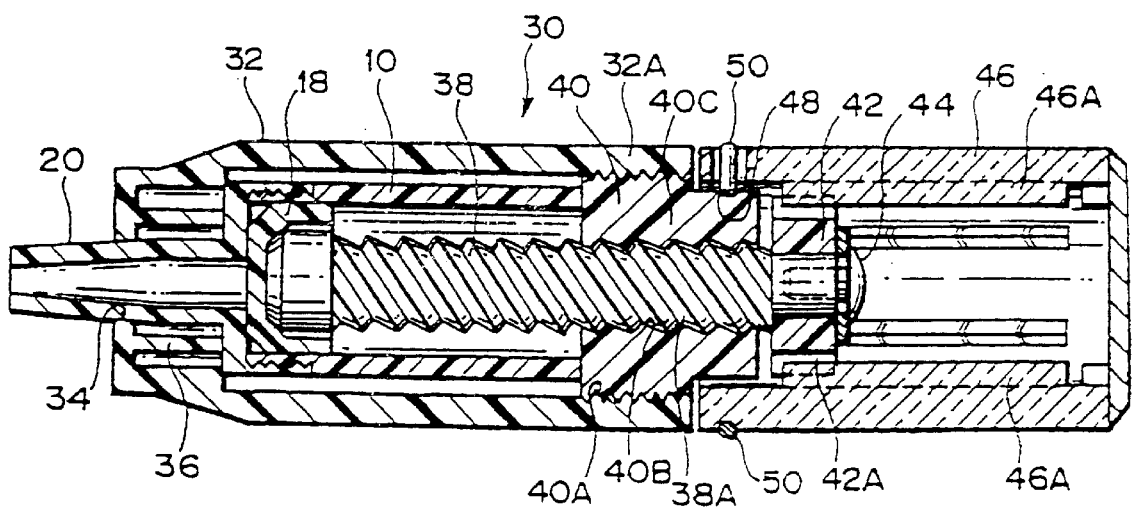
FIG. 5 is a vertical section showing the construction of the dispenser in a state after all the low cross-linking-density gel in the syringe has been dispensed by feeding a piston rod in the state shown in FIG. 4.

An internal thread 32A is formed in the inner surface of the right end of the outer tube 32 in FIGS. 4 and 5. On the other hand, a mount block 40 having a piston rod 38 reciprocatingly supported along its longitudinal direction as described later is mounted in the right end of the outer tube 32. The outer circumferential surface of the mount block 40 is divided into a left portion and a right portion, the left portion having a larger diameter than the right portion. On the outer circumferential surface of the left portion is formed an external thread 40A meshed with the internal thread 32A. The mount block 40 is fixedly mounted in the outer tube 32 by the engagement of the internal and external threads 32A and 40A.

In the center of the mount block 40 is formed a center hole 40B extending along its longitudinal direction. A lead groove 40C is spirally formed in the inner surface of the center hole 40B. The piston rod 38 is so inserted into the lead groove 38 as to be movable back and forth along its longitudinal direction, and has a lead groove 38A engageable with the lead groove 40C formed on its outer surface.

Since the piston rod 38 is supported in the mount block 40 by the spiral engagement of the lead grooves 38A, 40C, the piston rod 38 is made movable back and forth along its longitudinal direction by being rotated about its longitudinal axis with the mount block 40 fixed, in other words, the lead grooves 38A, 40C construct a first engaging means for moving the piston rod 38 along the longitudinal direction as the piston rod 38 is rotated.

The left end of the piston rod 38 is in contact with the sealing packing 18 in the syringe 10 mounted in the outer side from the right side. As the piston rod 38 is moved to the left, it pushes the sealing packing 18 to the left, thereby pushing the low cross-linking-density gel 22 contained in the syringe 10 to dispense it through a dispensing opening formed at the leading end of the nozzle 20. In other words, the sealing packing 18 functions as a cylinder head by mounting the syringe 10 functioning as a containing vessel in the dispenser 30.

At the right end of the piston rod 38, a slotted-head nut 42 formed on its outer surface with a plurality of spline grooves 42A extending along the longitudinal direction is fixed via a mount bolt 44. On the other hand, a rotary tube 46 is so mounted as to cover the piston rod 38 from the right side. On the inner circumferential surface of the rotary tube 46 is formed elongated projections 46A, which are engageable with the spline grooves 42A. The spline grooves 42A and the projections 46A construct a second engaging means for rotating the piston rod 38 together as the rotary tube 46 is rotated while permitting the piston rod 38 to move along its longitudinal direction.

By providing the second engaging means, as the rotary tube 46 is rotated about its longitudinal axis, the piston rod 38 is rotated together therewith and, as a result of that, is moved along the longitudinal direction.

A left portion of the rotary tube 46 extends up to a position where it faces the outer surface of the small-diameter portion of the mount block 40 at its right side in radial directions (i.e. to cover the outer circumferential surface of the small-diameter portion). In order to lock the rotary tube 46 in rotational positions spaced at specified angles, a multitude of recesses 48 for specifying the rotational positions spaced at every specified angle are formed one after another in circumferential direction on the outer surface of the small-diameter portion of the mount block 40.

The rotary tube 46 is mounted with a locking ring 50 having a leading end selectively engageable with one of the recesses 48. The locking ring 50 is made of a spring member and the leading end thereof is so set as to be elastically engageable with the recess 48. The recesses 48 and the locking ring 50 construct a rotation locking means for looking the rotary tube 46 every time it is rotated by a specified angle. The locking ring 50 specifies an angle of rotation of the rotary tube 46 and functions as a so-called snap ring for locking the rotary tube 46 so as not to disengage from the mount block 40 along the longitudinal direction.

Accordingly, the leading end of the locking ring 50 is elastically engaged with a certain recess 48 and, therefore, the rotary tube 46 is elastically locked in the rotational position. If the rotary tube 46 is forcibly rotated in its locked state, the leading end of the locking ring 50 is elastically deformed and comes out of the recess 48 it has been engaged with. After the rotary tube 46 is rotated by a specified angle, this leading end is engaged with the adjacent recess 48. Since the rotary tube 46 is elastically held in position after being rotated by the specified angle, the low cross-linking-density gel 22 in the syringe 10 is dispensed through the leading end of the nozzle 20 by an amount corresponding to the rotation of the rotary tube 46.

Since the recesses 48 are circumferentially arranged at equal intervals, a fixed amount of the low cross-linking-density gel 22 is constantly dispensed by rotating the rotary tube 46 by one interval of the recesses 48. This enables the dispenser 30 to dispense a predetermined amount of the low cross-linking-density gel 22.

The piston rod 38, the rotary tube 46, the first and second engaging means and the rotation locking means construct a dispensing means which comes into contact with the piston head 18 through the open end at the right side of Figures to push it to the left, thereby dispensing the low cross-linking-density gel 22 through the nozzle 20.

If the cylinder head 18 is moved to the left end in the syringe 10 as shown in FIG. 5 by continuously rotating the rotary tube 46, it means that all the low cross-linking-density gel 22 in the syringe 10 has been dispensed.

In this embodiment, the rotary tube 46 is made of a transparent material so that the position of the piston rod inside (position along the longitudinal direction) can be visually confirmed. As a result, an operator can roughly confirm a remaining amount of the low cross-linking-density gel 22 in the syringe 10 upon seeing the position of the piston rod 38.

Figure 6:
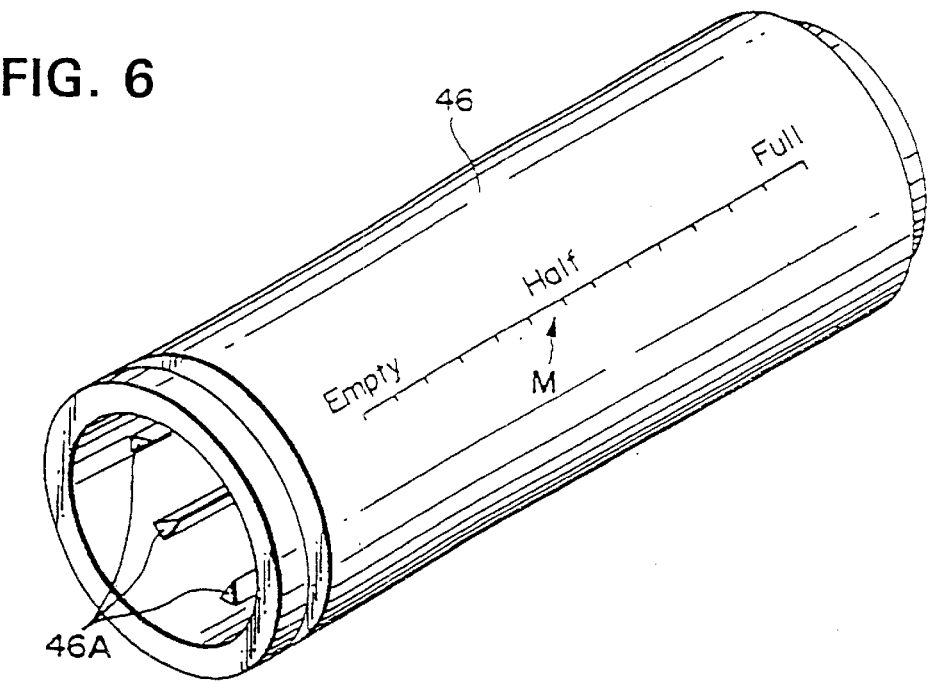
FIG. 6 is a perspective view showing a rotary tube.

By marking the slotted-head nut 42 secured to the piston rod 38 at its specified position and graduating the rotary tube 46 as shown in FIG. 6, the remaining amount of the low cross-linking-density gel 22 is more accurately comprehensible.

Next, how the dispenser 30 constructed as above is assembled is described.

First, the low cross-linking-density gel 22 is filled into the outer tube 32 according to the aforementioned manufacturing method; the syringe 10 having the nozzle 20 mounted at its leading end is inserted into the outer tube 32; and the nozzle 20 is caused to project outward through the insertion hole 34. Thereafter, the mount block 40 having the piston rod 38 already mounted therein is fixed to the outer tube 32 by meshing the external thread 40A and the internal thread 32A with each other. At this stage, the piston rod 38 is located in its most retracted position with respect to the mount block 40 lest the leading end thereof should inadvertently come into contact with the cylinder head 18 in the syringe 10 to thereby cause the low cross-linking-density gel 22 filled in the syringe 10 to leak from the nozzle 20.

Thereafter, the slotted-head nut 42 is secured to the rear end of the piston rod 38 using the bolt 44, and the rotary tube 46 is fitted from the right side in FIGS. 4 and 5 so that its leading end is located around the outer surface of the mount block 40. Then, the locking ring 50 is mounted on the outer surface of the leading end of the rotary tube 46, and the leading end thereof is engaged with one of the recesses 48. In this way, the rotary tube 46 is prevented from disengaging from the mount block 40 and is elastically held in the present rotational position.

{Description of the Optical Fiber Connector}

Figure 7:
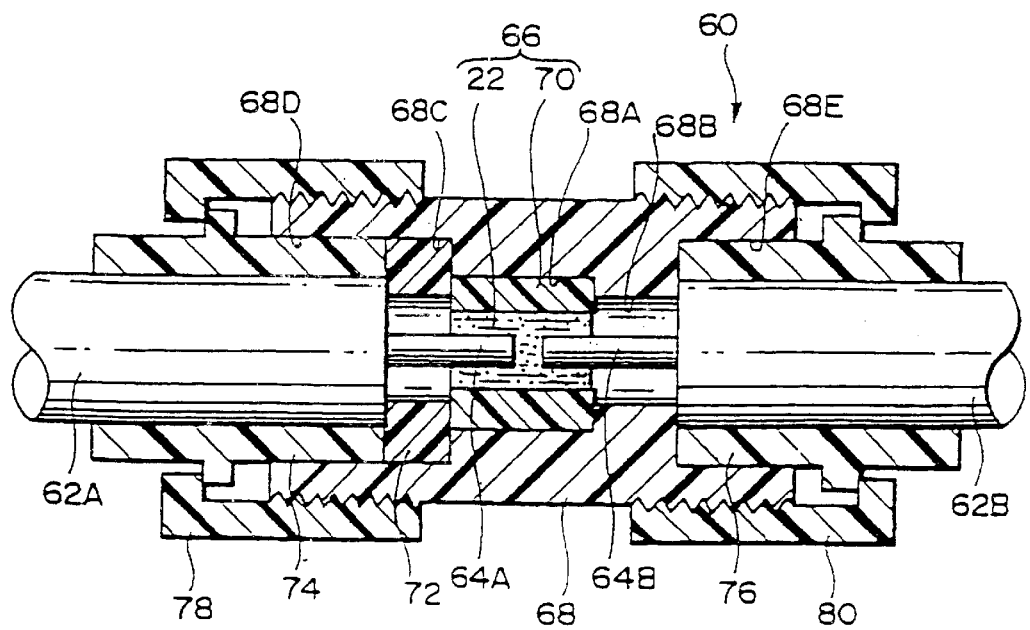
FIG. 7 is a vertical section showing the construction of one embodiment of an inventive optical fiber connector provided with an optical conductor filled with the low cross-linking-density gel.

The construction of an FC optical fiber connector (hereinafter, merely "connector") 60 as one embodiment of an inventive optical fiber connector in which the low cross-linking-density gel 22 is filled as an optical conductor using the dispenser 30 constructed as above is described with reference to FIG. 7.

The construction of the optical fiber connector is specified by the Japan Industrial Standards (JIS). For the FC type, it is specified to fit ferrules on cores 64A, 64B of two optical fibers 62A, 62B. However, in this embodiment, the cores 64A, 64B are inserted into an optical conductor 66 while being exposed without using the ferrules. It should be noted that the optical fiber is specified to have such a construction that a core has the outer surface thereof coated by a cladding, and a buffer or insulating layer covers the outer surface of the cladding.

Specifically, this connector 60 includes a double-split adapter 68, which is a hollow cylinder having open ends. The optical conductor 66 is fitted substantially in the middle position of the center hole of the adapter 68 with respect to a longitudinal direction.

In this embodiment, the optical conductor 66 is comprised of a plastic sleeve 70 and the low cross-linking-density gel 22 filled into the sleeve 70 using the dispenser 30.

More specifically, the center hole of the adapter 68 is comprised of first to fifth through holes 68A to 68E. The first through hole 68A is located in the middle along the longitudinal direction and the optical conductor 66 is closely fitted thereto. The second through hole 86B is located adjacent to the first through hole 68 at the right side and has a diameter smaller than that of the first through hole 86A. The third through hole 86C is located adjacent to the first through hole 86A at the left side and has a diameter larger than that of the first through hole 86A, and a cushion ring 72 to be described later is closely fitted thereinto. The fourth through hole 86D is located adjacent to the third through hole 86C at the left side, is open in the left end surface of the adapter 68 and has a diameter larger than that of the second through hole 86C, and a first fitting 74 to be described later is detachably fitted thereinto. The fifth through hole 68E is located adjacent to the second through hole 86B at the right side, is open in the right end surface of the adapter 68 and has a diameter larger than that of the second through hole 68B, and a second fitting 76 to be described later is detachably fitted thereinto.

The first and second fittings 74, 76 are so formed as to have the same shape and to hold the outer surfaces of the optical fibers 62A, 62B whose cores 64A, 64B are exposed from the end surfaces of the first and second fittings 74, 76, respectively. The first and second fittings 74, 76 are held in the adapter 68 by corresponding fixing nuts 78, 80 while being fitted in the fourth and fifth through holes 68D, 68E, respectively, How the connector 60 thus constructed is assembled is described below.

With all the parts described above being separated from each other, the optical conductor 66 filled with the low cross-linking density gel 22 is inserted into the center hole of the adapter 68 from the left in FIG. 6 to be closely fitted into the first through hole 68A. The optical conductor 66 is brought into contact with a step formed between the first and second through holes 68A and 68B to be located in a specified insertion position. Similarly, the cushion ring 72 is inserted into the center hole from the left to be closely fitted into the third through hole 68C. This cushion ring 72 is brought into contact with the optical conductor 66 to hold the optical conductor 66 in its specified insertion position.

Thereafter, the first fitting 74 bearing one optical fiber 62A is fitted into the fourth through hole 68D from the left and is held in this fitted state by the first fixing nut 78. With the first fitting 74 fitted into the adapter 68, the leading end face of the core 64B projecting from the held optical fiber 62A enters the low cross-linking-density gel 22 of the optical conductor 66 as shown in FIG. 6.

Subsequently, the second fitting 76 bearing the other optical fiber 62B is fitted into the fifth through hole 68E from the right and is held in this fitted state by the second fixing nut 80. With the second fitting 76 fitted into the adapter 68, the leading end face of the core 64B projecting from the hold optical fiber 62B enters the low cross-linking-density gel 22 of the optical conductor 66 as shown in FIG. 6.

Here, in the optical conductor 66, the leading end faces of both cores 64A, 64B are located in the low cross-linking-density gel 22. Projecting lengths of the cores 64A, 64B are set such that the both leading end faces are right opposite to each other with the first and second fittings 74, 76 properly mounted in the adapter 68. Since the projecting length, i.e. the cut positions of the cores 64A, 64B are specified in this way, the cut positions can be fairly roughly set as compared to a case where both end faces need to be precisely brought into contact with each other according to the conventional mechanical contact method. As a result, operability can be improved.

Specifically, since the low cross-linking-density gel 22 is filled in the optical conductor 66, it is present between the both end faces of the cores 64A, 64B even if these end faces are not closely faced opposite to each other. Thus, as described above, a loss of the light transmitted from one optical fiber 62A to the other 62B at the joint portion in this connector 60 can be maximally suppressed by the low cross-linking-density gel 22 present between the end faces.

It should be noted that the present invention is not limited to the construction and assembling procedure of the aforementioned embodiment, and a variety of modifications can be made without departing from the spirit and scope of the present invention.

For example, although the optical conductor 68 is comprised of the sleeve 70 and the low cross-linking-density gel 22 filled in the sleeve 70 in the foregoing embodiment, the present invention is not limited such a construction. The optical conductor may be formed only of the low cross-linking-density gel 22 without using the sleeve 70.

Further, although the low cross-linking density gel 22 is filled into the sleeve 70 of the optical conductor 66 to be mounted in the connector 60 using the dispenser 30 in the foregoing embodiment, it may be filled using a gel injecting apparatus having an other construction according to the present invention.

INDUSTRIAL APPLICABILITY

As described in detail above, the invention provides the dispenser which can dispense the low cross-linking-density gel used to join the end faces of the cores of the optical fibers; provides the optical fiber connector which can join the end faces of the cores of the optical fibers while effectively suppressing the diffusion of light despite its simple construction; and provides the optical fiber connector which can stably suppress the diffusion of light by maintaining its working performance over a long period of time. The inventive dispenser is suitably used to dispense the low cross-linking-density gel for the connection of the optical fibers. Further, the inventive optical fiber connector is suitably used for the connection of the end faces of the optical fibers.

What is claimed is:

1. A dispenser, comprising;
   an outer tube having one end formed with an insertion hole and the other end being open, and extending straight along a specified longitudinal axis,
   a syringe having one end to which a nozzle insertable into the insertion hole is attached, and being adapted to contain a low cross-linking-density gel which has been produced therein,
   a piston head slidably provided in the syringe along a longitudinal direction for sealing the low cross-linking-density gel therein, and
   a dispensing means mounted on the outer tube for coming into contact with the piston head through the open other end of the syringe to push it, thereby dispensing the low cross-linking-density gel in the syringe through the nozzle.

2. A dispenser according to claim 1, wherein a cap for sealing the inside of the syringe is mounted on the syringe instead of the nozzle when the low cross-linking-density gel is produced in the syringe.

3. A dispenser according to claim 1, wherein the piston head seals the inside of the syringe as a sealing packing when the low cross-linking-density gel is produced in the syringe.

4. A dispenser according to claim 1, wherein the dispensing means is so constructed as to dispense a predetermined amount of the low cross-linking-density gel.

5. A dispenser according to claim 4, wherein the dispensing means includes:
   a piston rod which is movably mounted on the outer tube along the longitudinal direction and whose leading end can be brought into contact with the piston head,
   a first engaging means provided between the piston rod and the outer tube for moving the piston rod along the longitudinal direction as the piston rod is rotated,
   a rotary tube rotatably mounted on the outer surface for covering the piston rod,
   a second engaging means which is provided between the rotary tube and the piston rod and is engaged to rotate the piston rod together as the rotary tube is rotated and permit the movement of the piston rod along the longitudinal direction, and
   a rotation locking means for locking the rotary tube such that the rotary tube is rotatable by a specified angle every time it is turned.

6. A dispenser according to claim 5, wherein the rotary tube is transparent so that the inside thereof is visible from outside.

7. A dispenser according to claim 6, wherein the outer circumferential surface of the rotary tube is so graduated as to indicate a remaining amount of the low cross-linking-density gel in the syringe.

8. A dispenser according to claim 4, wherein:
   the outer tube is integrally mounted with a mount block having a center hole which penetrates the mount block along its center axis,
   the piston rod is slidably inserted into the center hole,
   the first engaging means includes a lead groove formed on the outer surface of the piston rod and a lead groove formed in the inner surface of the center hole, the two lead grooves being meshed with each other, and
   the piston rod is moved along the longitudinal direction as being rotated about the center axis by the spiral engagement.

9. A dispenser according to claim 4, wherein the second engaging means includes at least one elongated projection formed on the piston rod and extending along the longitudinal direction and at least one spline groove formed in the inner surface of the rotary tube and extending along the longitudinal direction, the at least one projection and the at least one spline groove being engaged with each other.

10. A dispenser according to claim 8, wherein the rotary tube is so mounted as to cover the outer circumferential surface of the mount block, and the rotation locking means includes a plurality of recesses formed in the outer circumferential surface of the mount block and circumferentially arranged at equal intervals, and a locking ring mounted on the rotary tube and selectively elastically engageable with one of the plurality of recesses.

11. An optical fiber connector, comprising:
    an adapter formed with a center through hole extending along its center longitudinal axis, fittings bearing optical fibers from which cores project by specified distances being mountable into the through hole from the opposite sides such that the cores are aligned with each other, and
    an optical conductor arranged in the center through hole and including a sleeve fitted into the through hole and a low cross-linking-density gel filled in the sleeve,
    wherein the cores are inserted into the low cross-linking-density gel from the opposite sides such that the end faces thereof are opposed to each other.

12. An optical fiber connector according to claim 11, further comprising fixing nuts for fixing the fittings mounted into the adapter to the adapter.

13. An optical fiber connector according to claim 11, wherein the sleeve is made of a synthetic resin which is stable against the low cross-linking-density gel filled therein.

14. An optical fiber connector, according to claim 11, wherein the low cross-linking-density gel is produced by causing a flexible silicone gel material adjusted to have a specified refractive index to undergo an addition reaction in a binding region where cross-linking density is low.

15. An optical fiber connector according to claim 14, wherein the specified refractive index is substantially equal to that of the cores of the optical fibers to be connected.

16. An optical fiber connector according to claim 14, wherein the flexible silicone gel material is a polyorganosiloxane having vinyl groups at its ends and a polyorganosiloxane having covalently bound hydrogen atoms.

17. An optical fiber connector according to claim 14, wherein the addition reaction is performed by heating.

18. An optical fiber connector according to claim 14, wherein the low cross-linking-density gel is produced in a clean room.

* * * * *